United States Patent [19]

Chandler

[11] Patent Number: 5,241,166

[45] Date of Patent: Aug. 31, 1993

[54] LOW RESOLUTION TARGET ACQUISITION

[76] Inventor: Donald G. Chandler, 43 Springwood Ct., Princeton, Middlesex County, N.J. 08540

[21] Appl. No.: 547,755

[22] Filed: Jul. 2, 1990

[51] Int. Cl.⁵ .................. G06K 19/06; G06K 7/10; G06K 19/00

[52] U.S. Cl. .................. 235/494; 235/456; 235/487; 383/93; 380/51; 382/56

[58] Field of Search .............. 235/454, 456, 487, 494; 382/56, 11, 12; 283/901, 93; 380/51

[56] References Cited

U.S. PATENT DOCUMENTS

| | | | |
|---|---|---|---|
| D. 313,428 | 1/1991 | Drexler | D19/9 |
| 2,612,994 | 10/1952 | Woodland | 209/583 |
| 2,795,705 | 6/1957 | Rabinow | 250/219 |
| 2,914,603 | 11/1959 | Gabriel | 178/5.1 |
| 2,952,080 | 9/1960 | Avakian | 35/2 |
| 2,981,140 | 4/1961 | Ogle | 88/1 |
| 3,227,861 | 1/1966 | Schlieben | 235/61.12 |
| 3,234,663 | 2/1966 | Ferris | 35/2 |
| 3,279,095 | 10/1966 | Carlson | 35/2 |
| 3,409,760 | 11/1968 | Hamisch | 235/494 |
| 3,453,419 | 7/1969 | Tolley | 235/494 |
| 3,513,320 | 5/1970 | Weldon | 250/548 |
| 3,533,438 | 1/1971 | Blitz | 137/512.1 |
| 3,544,771 | 12/1970 | O'Meara | 235/494 |
| 3,549,897 | 12/1970 | Blake | 235/454 X |
| 3,550,770 | 12/1970 | Lund | 209/583 |
| 3,603,728 | 9/1971 | Arimura | 358/101 |
| 3,622,758 | 11/1971 | Schanne | 235/462 |
| 3,660,641 | 5/1972 | Levasseur | 235/494 |
| 3,693,154 | 9/1972 | Kubo | 235/471 X |
| 3,752,961 | 8/1973 | Torrey | 235/437 |
| 3,757,090 | 9/1973 | Haefeli | 235/437 |
| 3,776,454 | 12/1973 | Jones | 235/494 |
| 3,801,775 | 4/1974 | Acker | 235/470 |
| 3,808,405 | 4/1974 | Johnson | 235/494 |
| 3,818,191 | 6/1974 | Fennema | 235/437 |
| 3,820,498 | 6/1974 | Bosshard | 235/487 |
| 3,898,434 | 8/1975 | Bigelow et al. | 235/494 |
| 3,916,160 | 10/1975 | Russo | 235/494 |
| 3,959,631 | 5/1976 | Otten | 235/493 |
| 3,971,917 | 7/1976 | Maddox | 235/467 |
| 3,985,293 | 10/1976 | Riffee | 235/494 |
| 4,092,654 | 5/1978 | Alasia | 354/112 |
| 4,263,504 | 4/1981 | Thomas | 235/494 |
| 4,286,146 | 8/1981 | Uno | 235/456 |
| 4,403,339 | 9/1983 | Wevelsiep | 382/44 |

(List continued on next page.)

FOREIGN PATENT DOCUMENTS

| | | |
|---|---|---|
| 0299383 | 1/1989 | European Pat. Off. . |
| 0331758 | 9/1989 | European Pat. Off. . |
| 0336778 | 10/1989 | European Pat. Off. . |
| 2197200 | 3/1974 | France . |
| 63-298589 | 12/1988 | Japan .................. 235/494 |
| 64-053286 | 3/1989 | Japan .................. 235/494 |
| 1195588 | 8/1989 | Japan .................. 235/494 |
| 8100476 | 2/1981 | PCT Int'l Appl. . |
| 9007162 | 6/1990 | PCT Int'l Appl. . |
| 1216539 | 12/1970 | United Kingdom . |

OTHER PUBLICATIONS

"Principles and Practices of Information Theory" by Richard E. Blahut, Addison-Wesley Publishing Company, 1987, pp. 17 and 55–64.

Deposition Transcript of Patrick Devaney from Civil

(List continued on next page.)

Primary Examiner—Eugene R. LaRoche
Assistant Examiner—Christopher R. Glembocki

[57] ABSTRACT

A label and a process are provided for encoding target acquisition information and data information on an optically readable label at different resolutions. A multiplicity of cells is arranged in a regular pattern wherein each cell in the pattern may have one of at least two different optical properties to permit acquisition information encoding of the cells. Target acquisition information is encoded in the cells at a low resolution by assigning one of the plurality of optical properties to the cells in the pattern. The information-encoded cells are divided into a plurality of subcells. Data information is encoded at a high resolution in the subcells of the information-encoded cells.

38 Claims, 2 Drawing Sheets

U.S. PATENT DOCUMENTS

| | | | |
|---|---|---|---|
| 4,439,672 | 3/1984 | Salaman | 235/463 |
| 4,443,694 | 4/1984 | Sanford | 235/465 |
| 4,454,610 | 6/1984 | Sziklai | 382/3 |
| 4,476,382 | 10/1984 | White | 235/494 |
| 4,488,679 | 12/1984 | Bockholt | 235/469 |
| 4,544,064 | 10/1985 | Felder | 235/471 X |
| 4,579,370 | 4/1986 | Corwin et al. | 283/93 |
| 4,609,306 | 9/1971 | Langley | 235/454 |
| 4,634,850 | 1/1987 | Pierce | 235/487 |
| 4,641,346 | 2/1987 | Clark et al. | 380/51 |
| 4,641,347 | 2/1987 | Clark et al. | 380/51 |
| 4,654,718 | 3/1987 | Sueyoshi | 382/11 |
| 4,660,221 | 4/1987 | Dlugos | 380/51 |
| 4,705,938 | 11/1987 | Stockburger | 340/825.34 |
| 4,736,109 | 4/1988 | Dvorzsak | 235/456 X |
| 4,776,013 | 10/1988 | Kafri | 380/54 |
| 4,776,464 | 10/1988 | Miller | 209/3.3 |
| 4,814,594 | 3/1989 | Drexler | 235/487 |
| 4,864,618 | 9/1989 | Wright et al. | 380/51 |
| 4,874,936 | 10/1989 | Chandler et al. | 235/494 |
| 4,878,248 | 10/1989 | Shyu | 382/9 |
| 4,924,521 | 5/1990 | Dinan et al. | 382/56 |
| 4,926,035 | 5/1990 | Fujisaki | 235/494 |
| 4,939,354 | 7/1990 | Priddy et al. | 235/494 |
| 4,944,023 | 7/1990 | Imao et al. | 382/56 |
| 4,949,381 | 8/1990 | Pastor | 380/51 |
| 4,958,064 | 9/1990 | Kirkpatrick | 235/384 |
| 4,972,497 | 11/1990 | Saito et al. | 382/56 |
| 4,998,010 | 3/1991 | Chandler | 235/494 |

OTHER PUBLICATIONS

No. 91-4336 (D. N. J.), pp. 11-28 and Exhibit P-3A-1 referenced therein;

Deposition Transcript of Donald Chandler from Civil No. 91-4336 (D. N. J.), pp. 107-124 and Exhibit P-3 referenced therein;

Jul. 11, 1990 letter of F. M. Linguiti to Donald G. Chandler.

Jun. 22-23, 1987 notebook entries of Donald G. Chandler.

Jun. 12, 1990 letter from Eric P. Batterman to Jon T. Pojednic.

MRH Technology Presentation, dated May 22, 1990.

Letter dated Jul. 27, 1990 from A. J. Jacobson to F. M. Linguiti.

PRIOR ART

_Fig. 3A_  _Fig. 3B_

_Fig. 4A_  _Fig. 4B_

_Fig. 5A_

_Fig. 5B_

_Fig. 5C_

LOW RESOLUTION TARGET ACQUISITION

FIELD OF THE INVENTION

This invention relates to an improved optically readable label, and in particular to a label which is readable at a plurality of resolutions.

STATEMENT OF THE RELATED ART

Merchandise, various component parts, letters, packages, containers and a whole gamut of related items being shipped or transported, frequently must be identified with information regarding origin, flight number, destination, name, price, part number and numerous other kinds of information. In other applications, the reading of encoded information printed on labels affixed to such items permits automation of sales figures and inventory as well as the operation of electronic cash registers. Other applications for such encoded labels include the automated routing and sorting of mail, parcels, baggage, and the like, and the placing of labels bearing manufacturing instructions on raw materials or component parts in a manufacturing process. Labels for these types of articles are conventionally marked with bar codes, one of which is the Universal Product Code. Numerous other bar codes systems are also known in the art.

Commercially-available bar code systems typically lack sufficient data density to accommodate the present and increasing need to encode more and more information on labels of increasingly smaller size. Attempts to reduce the overall size and spacing of bars in various bar code systems to increase data density have not solved the problem because optical scanners having sufficient resolution to detect bar codes comprising contrasting bars spaced five mils or less apart are generally not economically feasible to manufacture because of the close tolerances inherent in the label printing process and the sophisticated optical apparatus required to resolve bit-encoded bars of these dimensions. Alternatively, to accommodate increased amounts of data, very large bar code labels have been fabricated, with the result that such labels are not compact enough to fit on small articles. Another important factor is the cost of the label medium, such as paper. A small label has smaller paper costs than a large label. This cost is an important factor in large volume operations.

Alternatives to bar codes include: circular formats using radially disposed wedged-shaped coded elements, such as those disclosed in U.S. Pat. No. 3,553,438, or concentric black and white bit-encoded rings, such as in U.S. Pat. Nos. 3,971,917 and 3,916,160; grids of rows and columns of data-encoded squares or rectangles, such as in U.S. Pat. No. 4,286,146; microscopic spots disposed in cells forming a regularly spaced grid, as disclosed in U.S. Pat. No. 4,634,850; and densely packed multicolored data fields of dots or elements, such as those described in U.S. Pat. No. 4,488,679. Some of the coding systems described in the foregoing examples and other coding systems known in the art primarily suffer from deficiencies in data density, such as in the case of encoded circular patterns and grids of rectangular or square boxes. Alternatively, in the case of the grids comprised of microscopic spots or multi-colored elements referred to above, such systems require special orientation and transport means, thus limiting the utility to highly controlled reading environments. U.S. Pat. No. 4,874,936 discloses a label for storing information encoded hexagons which stores densely packed information and may be read at high speed in any direction. However, relatively high resolution scanning is required to acquire the label of this system.

Modern conveyor systems may have conveyor belt widths of three to four feet and belt speeds of one hundred inches per second or more. They carry packages of varying heights on which information encoded labels are affixed. Thus, it can be very difficult for optical systems and decoding systems to locate and read the data encoded labels on these rapidly moving packages. Under the circumstances it is difficult for an optical scanner to simply acquire the label image. Increasing the resolution of the locating systems can make location more reliable. However, increasing the resolution can greatly increase the costs of these systems. Once the data encoded labels are acquired or identified, the label image must be accurately decoded before the next operation on the package in the conveyor system takes place, often in a fraction of a second. These problems have led to the need for providing a simple, rapid and low-cost means of signaling the presence of a data-encoded label within the field of view of an optical scanner mounted in a manner to permit scanning the entire conveyor belt.

Data arrays containing acquisition targets are known in the art; for example, concentric geometric figures including rings, squares, triangles, hexagons and numerous variations thereof, such as described in U.S. Pat. Nos. 3,513,320 and 3,603,728. U.S. Pat. Nos. 3,693,154 and 3,801,775 also describe systems using symbols comprising concentric circles as identification and position indicators, which symbols are affixed to articles to be optically scanned. However, these systems use two separate symbols to determine the identification of the data field and its position; thereby increasing the complexity of the logic circuitry required to detect the symbols, as well as reducing the data-carrying capacity of the associated data field. Also, when two symbols are used, damage to one causes problems in locating the position of the data field and the attendant ability to recover information from the data field. In the latter system, separate position and orientation markings are utilized at opposite ends of data tracks having data-encoded linear markings of only limited data-carrying capability.

The foregoing systems are generally scanned with an optical sensor capable of generating a video signal output corresponding to the change in intensity of light reflected off the data array and position and orientation symbols. The video output of such systems, after it is digitized, has a particular bit pattern which can be matched to a predetermined bit sequence. The systems, however, suffer the drawback of requiring two separate symbols for first acquiring the image and then determining its orientation. Also, the process of having to match the digitized signal output of the optical sensor with a predetermined bit sequence representing both the position and orientation symbols may produce erroneous readings because the prior art label acquisitions systems provide an inflexible characterization of the acquisition target signal level.

U.S. Pat. No. 3,553,438 discloses a circular data array having a centrally-located acquisition target comprising a series of concentric rings. The acquisition target provides a means of acquiring the circular label by the optical sensor and determining its geometric center and thereby the geometric center of the circular data array. This is done through logic circuitry operating to recognize the pulse pattern representative of the bullseye configuration of the acquisition target. However, as in the case of bar codes, the data array has only a limited data capacity and the system requires a second circular scanning process. The use of both a linear and circular scan for a system of such limited data capacity creates undesirable complexity in the system for a slight gain in data capacity over conventional bar codes. Additionally, it is difficult to acquire the label with relatively inexpensive, low resolution scanning.

The system set forth in U.S. Pat. No. 4,874,936 solves many of the problems of the prior art systems by providing very high data density as well as a reliable system for target acquisition. However, high resolution scanning of this label is required in order to acquire the target as well as to decode the high density data. An optical scanning system capable of scanning the high density data is more complex and costly than a system which is adapted to merely acquire a low resolution target.

It is therefore an object of this invention to provide improved, compact, high-information-density, optically-readable labels.

Another object of this invention is to provide new and improved optically-readable labels which may be both encoded and decoded with high density data as well as acquired by a low resolution optical scanner.

Further objects and advantages of the invention will be apparent from the description of the invention which follows.

SUMMARY OF THE INVENTION

A label and a process are provided for encoding target acquisition information and data information on an optically readable label at different resolutions. A multiplicity of cells is arranged in a regular pattern wherein each cell in the pattern may have one of at least two different optical properties to permit acquisition information encoding of the cells. Target acquisition information is encoded in the cells at a low resolution by assigning one of the plurality of optical properties to the cells in the pattern. The information-encoded cells are divided into a plurality of subcells. Data information is encoded at a high resolution in the subcells of the information-encoded cells.

DETAILED DESCRIPTION OF THE INVENTION

The ability to encode information by virtue of the contrasting colors of contiguous cells arranged in a predetermined sequence and array permits the information stored on the label to be recovered by an electro-optical sensor.

As used herein, "label" includes a discrete unit affixed with a suitable adhesive backing, or with any other means, to a package or product, and the exterior surface of the container or other objects on which optically-readable information is imprinted in accordance with this invention.

As used herein, "optically-readable information array" or "information array" means a pattern of cells or subcells having two or more optical properties to encode, in retrievable form, a body of information by virtue of the respective optical properties of and spatial relationship of the cells or subcells to each other. The cells or subcells imprinted to contain this recoverable information are referred to herein as "information-encoded" cells, because of the manner in which the label encodes information.

The contrasting reflective properties utilized to print the individual cells or subcells of information can be varied greatly within the spirit of this invention. As used herein, "printing" means depositing materials having predetermined optical properties on a substrate, or changing the optical properties, as when "thermal" printing is used. "Printing" also includes the omission to deposit a material having a predetermined optical property on a portion of the substrate, where the substrate itself has a distinct optical property. For example, when printing cells or subcells in black and white, if the substrate is white, then only black cells or subcells must actually be printed. Thus, as used herein, the white cells or white subcells are also within the definition of the term "print" or "printed."

Additionally, as used herein, "optical properties" means light absorption, reflection and/or refraction properties of cells or subcells printed in different media. Where cells or subcells are printed in black (high density black ink), gray (half tones of black) and white (no printing on a white substrate), the invention is said to have three differing optical properties.

"Contiguous cells" are cells arranged with the geometric centers of adjacent cells lying at the vertices of a predetermined two-dimensional array and with the borders of such cells touching the borders of immediately adjacent cells, leaving no interstitial spaces. "Partially contiguous cells" are cells arranged with the geometric centers of adjacent cells lying at the vertices of a predetermined two-dimensional array and which cells are separated somewhere along their respective borders from other surrounding cells, thereby causing a multiplicity of interstitial spaces to be interspersed among the cells on the optically readable label. "Noncontigous cells" are individual cells arranged with the geometric centers of adjacent cells lying at the vertices of a predetermined two-dimensional array, and having no contact between the borders of an individual cell and cells surrounding the cell. Additionally, the cells and the predetermined two-dimensional grids or arrays upon which the centers of adjacent cells are located may be irregular, having unequally-spaced axes, or regular, having equally-spaced axes, in configuration. Such two-dimensional array axes may be independent of the axes of symmetry, if any, of the cells.

Figures 1, 2A:
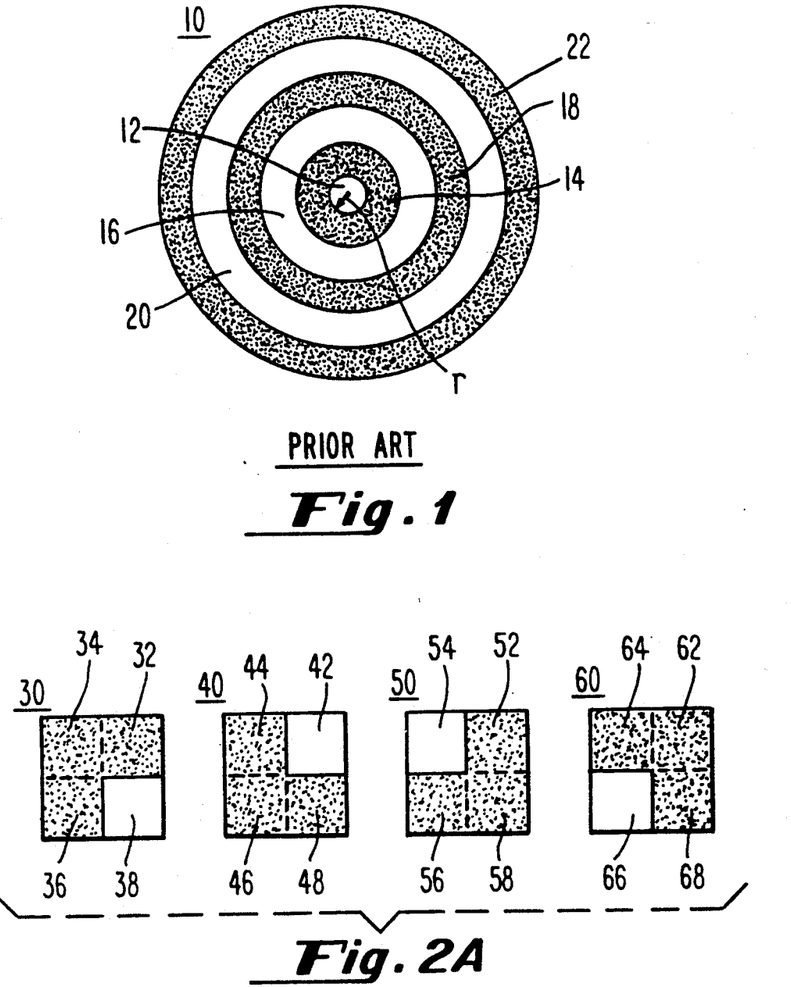
FIG. 1 is a plan view of a prior art acquisition target formed of concentric rings.
FIGS. 2A,B are plan views of the low resolution information-encoded cells of the present invention, each low resolution information-encoded cell subdivided into a plurality of high resolution information-encoded subcells.

Referring now to FIG. 1, there are shown prior art concentric rings 10 which may be used as an acquisition target for an optically encoded label. As used herein, "concentric rings 10" or "plurality of concentric rings 10" means two or more concentric rings, one of which is the interior area of a circular zone defined by the smallest radius "r" of the rings. Additionally, as used herein, "concentric rings 10" is intended to embrace complete rings, partial rings in a form of semi-circles, sectors of concentric rings occupying between 180 degrees and 360 degrees and concentric spirals which approximate concentric rings.

Acquisition target 10 or concentric rings 10 are used in enabling an optical scanning system to acquire a label in an information encoding system taught in U.S. Pat. No. 4,874,936. Acquisition target 10 comprises a plurality of concentric rings 12, 14, 16, 18, 20, and 22 of contrasting colors which are herein shown as black and white. Because concentric rings 12, 14, 16, 18, 20 and 22 of acquisition target 10 are formed with contrasting colors, an optical scan of acquisition target 10 by optical sensing equipment provides acquisition information which may be used to acquire a label provided with acquisition target 10. Thus acquisition information as used herein includes information obtained by optically sensing a target which is used by optical scanning equipment to determine the presence of the target.

The white rings of acquisition target 10 are respectively designated concentric white rings 12, 16, and 20. The black rings of acquisition target 10 are respectively designated concentric black rings 14, 18, and 22. Acquisition target 10 is preferably located in the geometric center of a label, to make it less susceptible to being damaged or destroyed, in whole or in part, if the periphery of the label is torn, soiled or damaged. Also, the size of an image buffer for storing the information from the label before the target is identified is minimized when acquisition target 10 is in the label center.

Six concentric rings 12, 14, 16, 18, 20, and 22 of acquisition target 10, and their resulting interfaces as they vary from white to black to white, etc., have been found to be convenient. However, it will be understood by those skilled in the art that the number of concentric rings used in an acquisition target such as acquisition target 10 may be varied. When acquiring concentric rings 10, or when acquiring acquisition targets having other numbers of concentric rings, a pattern correlating technique is used to match a computed pattern of what the target is expected to be when the pattern is being read. Therefore it will be understood that one skilled in the art may select a matching technique to operate upon different numbers of concentric rings within different acquisition targets. When the match occurs acquisition target 10 has been located. A filter suitable for performing this type of correlation is taught in U.S. Pat. Nos. 4,874,936 and 4,896,029 which are herein incorporated by reference.

An acquisition target may take shapes other than concentric rings 10. For example, squares, spirals or hexagons may be used in order to create transitions of contrasting concentric figures, so long as linear sections through the acquisition target create regular, predetermined and identifiable color transitions, susceptible of being sensed by an electro-optical sensor and measured by a suitable filter. It is to be noted that, although a spiral is not a collection of concentric circles, depending on the size and radius of the spiral, a close approximation of concentric circles can be achieved. A target of concentric rings such as concentric rings 10 is preferred, because a signal generated by a scan through their center has a frequency which is the same when sections are taken in any direction through the center of concentric rings 10. This makes identification of the center simpler, and allows identification of the location of the acquisition target with a one-dimensional search of the analog or digital output of the scanner, although a two-dimensional digital search may be used for increased accuracy.

In first acquiring the label image, a conventional analog band pass filter can be used to identify two or more optical properties of an acquisition target such as an acquisition target provided by concentric rings 10. These two optical properties are preferably the colors black and white because the greatest contrast will create the strongest signal energy. In order to find a mixed pattern of transitions from black to white to black, it is desirable that a linear scan across the acquisition target and passing through the center of target yield a uniform frequency response regardless of label orientation. Thus, the target rings are optimally comprised of contrasting concentric rings 10. The sensor output may then be bifurcated and taken through two detection paths. One path may detect all the energy in the sensor output and the other path may measure the energy at the ring frequency. When the two outputs are compared, the energy in the ring detector most closely approximates the energy in the all energy detector when a scan through the acquisition target is being sensed. The acquisition target center is located when this closest approximation occurs.

However, in order to achieve these desirable results, concentric white rings 12, 16, and 20 and concentric black rings 14, 18, and 22 need not be solid white or solid black. At low enough resolution of concentric white rings 12, 16, and 20, and with suitable algorithms for conditioning scanned data, concentric white rings 12, 16, and 20 may appear solid white even though there may be a number of black subcells distributed within them. Similarly, at low enough resolution concentric black rings 14, 18, and 22 may appear solid black even though there may be a number of white subcells distributed within them.

Referring now to FIG. 2A, there are shown black information-encoded cells 30, 40, 50, and 60 of the present invention. Black information-encoded cells 30, 40, 50, and 60 may be contiguously arranged to form an optically-readable multi-resolution information array. Additionally, each black low resolution information-encoded cell 30, 40, 50, and 60 is itself a two-by-two optically-readable information array formed of four subcells. Information-encoded cells 30, 40, 50, and 60 are determined to be black by low resolution scanning equipment because three of the four subcells within each low resolution cell 30, 40, 50, and 60 are black. The single white subcell 38, 42, 54, and 66 within each black cell 30, 40, 50, and 60 is not sensed by a low resolution scan.

Black low resolution information-encoded cell 30 contains three black subcells 32, 34, and 36 as well as one white subcell 38. Subcells 32, 34, 36, and 38 of black low resolution information-encoded cell 30 may be used to store information because each subcell 32, 34, 36, and 38 may have one of at least two differing optical properties. High resolution data information may thus be encoded within low resolution information-encoded cell 30 by assigning one of the different optical properties to one of the high resolution information-encoded subcells 32, 34, 36, and 38. An optically-readable information array formed of a plurality of contiguously arranged information-encoded cells 30 presents a surface area which is 75% black and 25% white. This surface area is sensed as solid black when scanned by relatively low resolution scanning equipment because white subcells 38, 42, 54, and 66 are not sensed at low resolution.

Optically-readable information arrays formed of information-encoded cells 40, 50, and 60 also present surface areas which are 75% black and 25% white when scanned at a low resolution. In a similar manner, an optically-readable information array formed of any combination of different black information-encoded cells 30, 40, 50, and 60 also presents a surface area which is 75% black and 25% white when scanned at a low resolution. It will be understood that high resolution data information can be stored within low resolution information-encoded cells 40, 50 and 60 which, as previously described for low resolution cell 30, are each divided into two-by-two optically-readable information arrays.

When low resolution scanning is applied to a label wherein a region is formed of a combination of black cells 30, 40, 50, and 60, the scanned region is sensed as black. For example, if concentric black rings 14, 18, and 22 of acquisition target 10 are formed of a combination of black information-encoded cells 30, 40, 50, 60, a low resolution scan of acquisition target 10 senses concentric rings 14, 18, and 22 as solid black. Concentric rings 14, 18, and 22 are sensed as solid black at low resolution in spite of the presence of white information-encoded subcells 38, 42, 54, and 66 distributed throughout them.

Figure 2B:
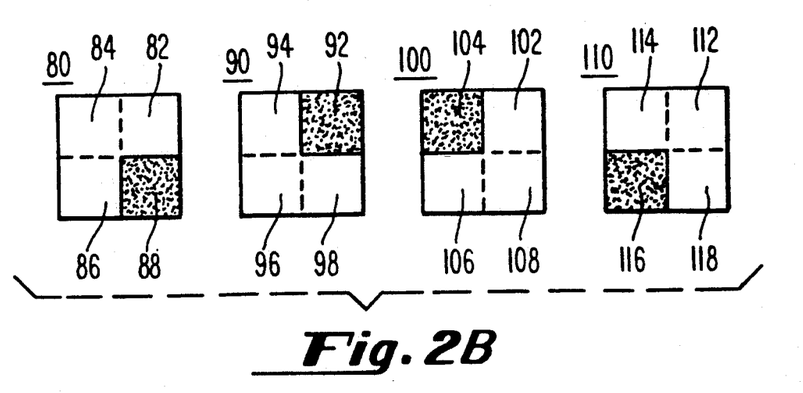

Referring now to FIG. 2B, there are shown white information-encoded cells 80, 90, 100, and 110 of the present invention. White information-encoded cells 80, 90, 100, and 110 may be contiguously arranged to form an optically-readable multi-resolution information array. Additionally, each white information-encoded cell 80, 90, 100, and 110 is itself a two-by-two optically-readable information array formed of four subcells. Information-encoded cells 80, 90, 100, and 110 are determined to be white by low resolution scanning equipment because three of the four subcells within each low resolution cell 80, 90, 100, and 110 are white. The single black subcell 88, 92, 104, 116 within each white cell 80, 90, 100, and 10 is not sensed by a low resolution scan.

White low resolution information-encoded cell 80 includes three white subcells 82, 84, and 86, as well as one black subcell 88. Subcells 82, 84, 86, and 88 of white low resolution information-encoded cell 80 may be used to store information because each subcell 82, 84, 86, and 88 may have one of at least two different optical properties. High resolution data information may thus be encoded within low resolution-encoded cell 80 by assigning one of the different optical properties to high resolution information-encoded subcells 82, 84, 86, and 88. An optically-readable information array formed of a plurality of contiguously arranged information-encoded cells 30 presents a surface area which is 75% white and 25% black. This surface area is sensed as solid white when scanned by relatively low resolution scanning equipment because black subcells 88, 92, 104, and 116 are not sensed at low resolution.

In a similar manner, optically-readable information arrays formed of information-encoded cells 90, 100, and 110 also present surface areas which are 75% white and 25% black. An optically-readable information array formed of any combination of white information-encoded cells 80, 90, 100, and 110 presents a surface area which is 75% black and 25% white. It will be understood that high resolution data information can be stored within low resolution information-encoded cells 90, 100, and 110 which, as previously described for low resolution cell 80, are each divided into two-by-two optically-readable information arrays.

When low resolution scanning is applied to a region of a label which is formed of a combination of white cells 80, 90, 100, and 110, the scanned region is sensed as white. For example, if concentric white rings 12, 16, and 20 of acquisition target 10 are formed of a combination of white information-encoded cells 80, 90, 100, and 110, a low resolution scan of acquisition target 10 senses concentric rings 12, 16, and 20 as solid white. Concentric rings 12, 16, and 20 are sensed as solid white at low resolution in spite of the presence of black information-encoded subcells 88, 92, 104, and 110 distributed throughout them.

Thus using multi-resolution cells 30, 40, 50, 60, 80, 90, 100, and 110 two levels of information may be encoded on the same label in the same location. One level of information may be encoded at relatively low resolution while simultaneously a second level may be encoded at relatively high resolution. For example, acquisition information may be encoded at low resolution to permit easy acquisition of the target by the optical scan equipment and data information such as address data information or package contents data information may be encoded at high resolution.

Low resolution information may be encoded by arranging a plurality of black low resolution information-encoded cells 30, 40, 50, and 60 to form black portions of an optically-readable information array. For example, black low resolution cells 30, 40, 50 and 60 may be arranged as concentric black rings 14, 18, and 22 of acquisition target 10. Likewise, low resolution information may be encoded by arranging a plurality of low resolution white information-encoded cells 80, 90, 100, and 110 to form white portions of an optically-readable information array. For example, white low resolution cells 80, 90, 100, and 110 may be arranged as concentric white rings 12, 16, and 20 of acquisition target 10. Thus low resolution cells 30, 40, 50, 60, 80, 90, 100, and 110 may be used to encode target acquisition information of a label.

It will be understood by those skilled in the art that when low resolution cells 30, 40, 50, 60, 80, 90, 100, and 110 are arranged in a optically readable information-encoded array, they need not be arranged contiguously. Cells 30, 40, 50, 60, 80, 90, 100, and 110 may be arranged partially contiguously or noncontiguously. The interstitial spaces between partially contiguous or noncontiguous cells may be optically encoded. However, these interstitial spaces tend to create noise at high resolution and therefore should not be too large. It will also be understood by those skilled in the art that the subcells within the cells of the present invention need not be contiguous. The subcells can be partially contiguous or noncontiguous. The interstitial spaces between partially contiguous subcells or noncontiguous subcells should not be very large. It will also be understood by those skilled in the art that cells 30, 40, 50, 60, 80, 90, 100, and 110 need not be square. They may be rectangles other than squares, or polygons other than rectangles.

Cells 30, 40, 50, 60, 80, 90, 100, and 110, as well as all subcells within them, are formed by a printing process which prints them having two or more optical properties, for example, contrasting colors. These colors may be white, black, and optionally, but preferably, gray, although other contrasting colors may be utilized. It is possible to use only two contrasting colors, such as white and black. The particular shades of white, black, and gray are selected to achieve optimum contrast for ease of information by an electro-optical sensor. The gray level is selected so that its optical properties fall approximately equally between the optical properties of the white and black being used.

The printing of cells 30, 40, 50, 60, 80, 90, 100, and 110 may be performed on a discrete label. Alternatively, if an acceptable color background is utilized, preferably white, the printing may be performed directly on the package surface, without requiring a discrete label. Because of the importance of having a controlled optical property background for one of the contrasting colors, it is preferable to use a discrete label, because the color of a label background is more easily controlled than the color of a package.

The black portions can be formed by printing with a standard black ink. Software for a scanning analysis of the decoding process makes gross determinations among black, gray, and white reflections, so that precise color definition is not necessary. On the other hand, if colors other than black, gray, and white are used, or various shades of gray are used, to create four or five color data arrays, the contrast of ink shades must be much more carefully controlled to ensure measurable optical property differences among the various colors. It will be appreciated that the use of black ink is the simplest and easiest approach to creating the three differing optical properties. Scanning analyses software suitable for this decoding process is set forth in U.S. Pat. No. 4,806,029.

Figure 3A:
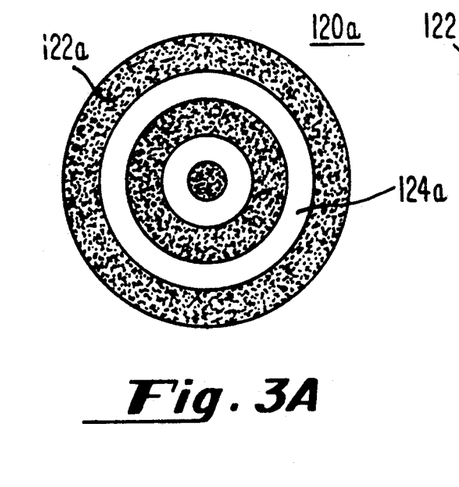
FIGS. 3A,B are plan views at different resolutions of a label having a concentric ring acquisition target formed of the multi-resolution information-encoded cells of FIGS. 2A,B.
Figure 3B:
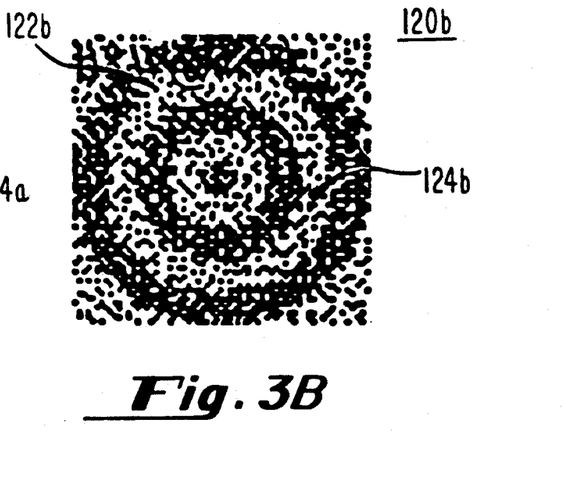

Referring now to FIGS. 3A,B, there are shown multi-resolution information-encoded labels having concentric ring acquisition targets 120a,b. Concentric ring acquisition targets 120a,b may be part of an optically-readable label for allowing optical scanning equipment to locate the label. Concentric ring acquisition target 120b is a high resolution representation wherein the high resolution minority subcells are sensed using relatively high resolution scanning equipment. Concentric ring acquisition target 120a, is a low resolution representation of the same acquisition target wherein the high resolution minority subcells are not sensed due to scanning of concentric ring acquisition target 120b by low resolution scanning equipment.

Black concentric rings 122a,b of acquisition targets 120a,b are formed of black low resolution information-encoded cells 30, 40, 50, and 60. However, at low resolution, white minority subcells 38, 42, 54, and 66 within low resolution cells 30, 40, 50, and 60 are not sensed. White concentric cells 124a,b of acquisition targets 120a,b are formed of white low resolution information-encoded cells 80, 90, 100, and 110. However, at low resolution, black minority subcells 88, 92, 104, and 116 are not sensed. Thus all low resolution cells 30, 40, 50, 60, 80, 90, 100, and 110 within acquisition targets 120a,b are formed of a plurality of high resolution information-encoded subcells which are sensed in the high resolution scan of high resolution acquisition targets 122a but are not sensed in the low resolution scan of low resolution acquisition target 120b.

Each white low resolution information-encoded cell 80 within high resolution concentric rings 120b is sensed as three white high resolution subcells 82, 84, 86 and one black high resolution information-encoded subcell 88. Likewise, each black low resolution information-encoded cell 30 within high resolution black concentric rings 122 is formed of plurality of high resolution information-encoded subcells. Black low resolution information-encoded cell 30 is sensed as three black high resolution information-encoded subcells 32, 34, 36 and one white high resolution information-encoded subcell 38 by a relatively high resolution optical scan.

Thus high resolution black concentric rings 122b contain a plurality of white high resolution information encoded subcells 38, 42, 54, and 66 distributed throughout them. High resolution white concentric rings 124a contain a plurality of high resolution information-encoded subcells 88, 92, 104, and 114 distributed throughout them. However, during scanning by low resolution optical scanning equipment, black high resolution information-encoded subcells 88, 92, 104 and 116 are not sensed and low resolution black concentric rings 122b appear solid black. Likewise, during scanning by low resolution optical scanning equipment, white low resolution information-encoded subcells 38, 42, 54 and 66 are not sensed and low resolution white concentric rings 124b appear solid white.

Thus, low resolution scanning equipment may be used for target acquisition of the label of acquisition target 120a. Low resolution target acquisition allows target acquisition to be more reliable, allowing a higher rate of successful acquisitions while obtaining a lower rate of false acquisitions and maintaining a high density of data information. Alternately, illumination and focusing requirements may be relaxed. High resolution information encoding of target 120a using the bit patterns of low resolution cells 30, 40, 50, 60, 80, 90, 100, and 110 permits the high data density to be maintained while allowing greatly simplified low resolution target acquisition. It will be understood by those skilled in the art that conventional pattern recognition techniques may be used for determining the acquisition of acquisition targets 120a,b.

Figure 4A:
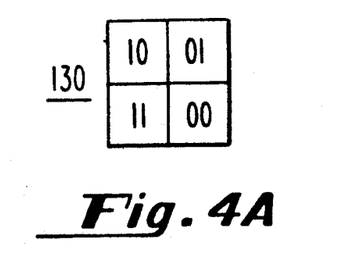
FIGS. 4A,B are possible bit maps for high resolution encoding/decoding of the information of the high resolution subcells of FIGS. 2A,B.
Figure 4B:
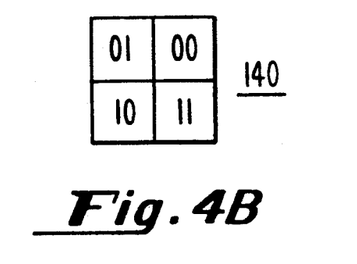

Referring now to FIGS. 4A,B, there are shown two alternate high resolution information maps 130, 140 for encoding and decoding high resolution information within low resolution information-encoded cells such as black information-encoded cells 30, 40, 50, and 60 and white information-encoded cells 80, 90, 100, and 110. Each of the black and the white low resolution information-encoded cells is itself divided into a two-by-two optically-readable information array. Within the resulting two-by-two array of subcells, three of the four subcells have a common optical property and the fourth subcell has a different optical property. For example, within black information-encoded cell 30, the majority of subcells 32, 34, 36, and 38 are black. This majority includes subcells 32, 34, and 36. The different or minority subcell 38 within low resolution cell 30 is white.

In white information-encoded cell 80, the majority of subcells 82, 84, 86 and 88 are white. This majority includes white subcells 82, 84, and 86. The different subcell 88 or minority subcell 88 within low resolution cell 80 is black. Thus, each information-encoded cell 30, 40, 50, 60, 80, 90, 100, and 110 has a minority subcell of a different optical property while the majority of the remaining subcells of each cell have the optical property of the overall low resolution cell.

One method of decoding the high resolution information within information-encoded cells 30, 40, 50, 60, 80, 90, 100, and 110 of the present invention is using an encode/decode map such as high resolution information map 130. When using high resolution information map 130, the binary value 00 is determined if the different subcell of a low resolution cell is in the lower right corner of the cell. This is true regardless of whether the different or minority subcell is black subcell 88 within white low resolution cell 80, or white subcell 38 within black low resolution cell 30.

Likewise, if the different subcell is in the upper right corner of a low resolution cell, the high resolution information determined to be the binary number 01 according to map 130. This is true regardless of whether the minority subcell in the upper right corner of the cell is white subcell 42 within black low resolution cell 40 or black subcell 92 within white low resolution cell 90. High resolution information map 140 is used in the same manner. If the different or minority subcell is in the lower right corner of a low resolution cell, the high resolution information is determined to be the binary number 11 using decoding map 140. This is true regardless of whether the minority subcell in the lower right corner is black subcell 88 within white low resolution cell 80, or white subcell 38 within black low resolution cell 30. It will be understood by those skilled in the art that many other high resolution information maps may be provided and that many other methods for encoding and decoding the high resolution data within the low resolution cells may be used.

Thus, after the encoding of low resolution target acquisition information within label 120 in the form of concentric rings 122a,b, 124a,b by means of low resolution cells, high resolution data information may be encoded in label 120a,b by means of high resolution subcells within the low resolution cells. In order to perform the encoding of high resolution data information in label 120a,b, a single white subcell 38, 42, 54 or 66 is disposed at a selected location within each black information-encoded cell 30, 40, 50, and 60 which form concentric black rings 122a,b. The single white subcell 38, 42, 54, or 66 may be disposed in any one of the four locations of two-by-two black information-encoded cells 30, 40, 50, and 60. The minority location within each low resolution cell 30, 40, 50, and 60 is selected in accordance with the data information to be encoded and in accordance with, for example, high resolution map 130 or high resolution map 140.

Therefore it will be understood that each low resolution information-encoded cell 30, 40, 50, 60, 80, 90, 100, and 110, while appearing as a single solid black cell or a solid white cell during a low resolution scan of label 120, may be used to encode two bits of high resolution data for decoding by high resolution optical scanning equipment. The ability to encode the high resolution information is achieved by dividing black information-encoded cells 30, 40, 50, 60, 80, 90, 100, and 110, within an optically-readable information array, into a plurality of information-encoded subcells. It will also be understood that low resolution cells may be divided into a number of high resolution subcells other than four subcells, provided that the percentage of minority subcells does not exceed that percentage which permits the cell to be determined to have its assigned optical property when scanned by low resolution optical equipment.

It will be understood by those skilled in the art that the orientation of the label of high resolution acquisition target 122a must be determined before high resolution decoding of target 122a in accordance with a high resolution map such as high resolution map 130 or high resolution map 140. If orientation is not determined, there is no way to distinguish between the various locations within low resolution cells 30, 40, 50, 60, 80, 90, 100, and 110. In order to determine the orientation of the label of high resolution acquisition target 122a, any conventional means of orientation determination may be used. One method is to embed unique patterns of high resolution subcells at predetermined locations within target 122a. For example, cells containing four white subcells or four black subcells may be disposed at predetermined locations throughout high resolution acquisition target 122a. Another method which may be used is to embed known repeating patterns in acquisition target 122a. A method for determining the major axis of an optically-readable information encoded array formed of hexagons as set forth in U.S. Pat. No. 4,874,936. Orientation is not required in decoding low resolution acquisition target 120b.

Figure 5A:
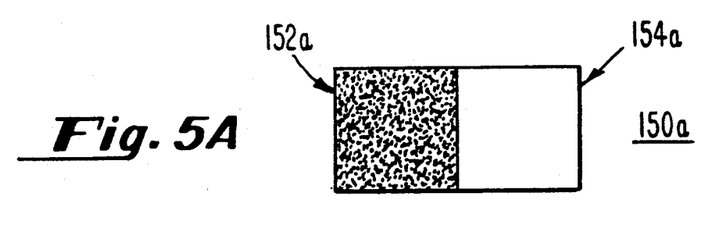
FIGS. 5A,B,C are blocks of information-encoded cells of FIGS. 2A,B illustrating different high resolution encoding/decoding of the same low resolution information cells.

Referring now to FIG. 5A, there is shown a low resolution view of information block 150a. Information block 150a is formed of black low resolution information-encoded cell 152a and white low resolution information-encoded cell 154a. Low resolution information-encoded cells 152a, 154a appear solid black and solid white respectively when scanned at low resolution. Each low resolution cell 152a, 154a contains a high resolution minority subcell of a different optical property within it which is not sensed by a low resolution scan or shown in a low resolution representation. Information block 150a may occur, for example, at an interface between a concentric black ring 122b and a concentric white ring 124b of acquisition target 120b. Black low resolution information-encoded cell 152a and white low resolution information-encoded cell 154a within information block 150a may be formed in any one of a plurality of different ways when high resolution data information is encoded within low resolution cells 152a, 154a.

Figure 5B:
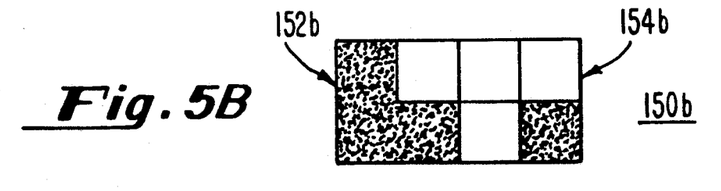

Referring now to FIG. 5B, there is shown information block 150b. Black information-encoded cell 152b of information block 150b contains the same high resolution bit pattern as black low resolution information-encoded cell 40. Likewise, white low resolution information-encoded cell 150b of information block 150b contains the same high resolution bit pattern as black information-encoded cell 80. If information block 150a decodes, for example, to the binary number 10 under low resolution decoding, then information block 150b also decodes to the binary number 10 under low resolution decoding.

Using high resolution information map 130 to perform high resolution decoding of subcells 42, 44, 46, and 48 of black low resolution information-encoded cell 40, low resolution cell 40 decodes to the binary number 01 because the different subcell 42 is in the upper right corner of cell 40. Likewise, white low resolution information-encoded cell 80 of information block 150b decodes to the binary number 00 using high resolution map 130 because the different subcell 88 of cell 80 is in the lower right corner. Thus information block 150b decodes to the binary number 0100 in a high resolution scan and to the binary number 10 in a low resolution scan.

Figure 5C:
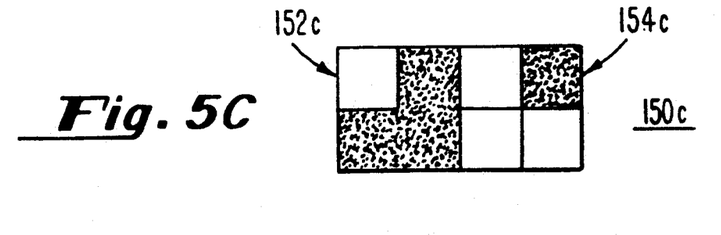

Referring now to FIG. 5C, there is shown information block 150c. Information block 150c includes black low resolution information-encoded cell 152c and white low resolution information-encoded cell 154c. Therefore, information block 150c, like information blocks 150a,b, is decoded as the binary number 10 by low resolution information decoding. Information block 150c decodes to the same low resolution binary number 10 as information blocks 150a,b because in a low resolution scan, information-encoded cell 152c decodes to black, the same as cell 152a of block 150a and cell 152b of block 150b. Information encoded cell 154c decodes to white in a low resolution scan, the same as cell 154a of block 150a and cell 150b of block 150b. Similarly, information-encoded cell 154c decodes to white in a low information scan in the same manner that information-encoded cell 80 decodes to white in a low resolution scan.

Cell 152c has the same high resolution bit pattern as low resolution cell 50. Using high resolution information map 120, cell 50 is decoded to the binary number 10. Cell 154c has the same low resolution bit pattern as low resolution cell 90. Therefore low resolution cell 150c is decoded to the binary number 01 in a high resolution scan. Thus, in a high resolution scan of information block 150c, information block 50c decodes to the binary number 1001. This binary number differs from the high resolution decoding binary number 0100 of information block 150b, even though information blocks 150b,c both decode to the same low resolution binary number 10. Thus it can be seen that different high resolution data information can be encoded within the high resolution subcells contained in the cells of information block 150a while retaining the low resolution encoding value of binary 10.

It will be appreciated that although a preferred embodiment is disclosed and described, many variations are possible without departing from the spirit or scope of this invention.

What is claimed is:

1. In a system for optically reading an optically readable label, a label for storing encoded information comprising a multiplicity of information-encoded cells, comprising:
    cells of said multiplicity of cells divided into information-encoded subcells adapted to have at least two differing optical properties wherein a selected information-encoded cell is determined to have a first optical property when a majority of the subcells of said selected information-encoded cell has said first optical property;
    a selected minority subcell of said information-encoded cell having a second optical property; and,
    said selected minority subcell being disposed at a position within said selected cell in accordance with information.

2. A system as recited in claim 1, wherein said information-encoded cells have one optical property selected from at least two differing optical properties.

3. A system as recited in claim 2, further comprising:
    means for assigning a first optical property of said differing optical properties to a first plurality of selected information-encoded cells;
    means for assigning a second optical property of said differing optical properties to a second plurality of selected information-encoded cells; and,
    means for arranging said first plurality of selected information-encoded cells and said second plurality of selected information-encoded cells to provide respective contrasting optical properties of an acquisition target for acquiring said label by optical scanning equipment.

4. A system as recited in claim 3, further comprising means for arranging said first and second pluralities of selected information-encoded cells as respective concentric rings of selected information-encoded cells, each ring of said concentric rings being formed of cells having one of said first and second optical properties.

5. A system as recited in claim 2, further comprising:
    means for illuminating said label;
    low resolution sensing means for optically sensing light reflected from said information-encoded cells and providing electrical signals representative of said reflected light;
    means for transmitting said electrical signals;
    first means for determining, in accordance with said transmitted electrical signals, that an optically sensed cell has a determined one of said differing optical properties when a majority of subcells of said optically sensed cell has said determined optical property; and,
    means for decoding low resolution information in accordance with a plurality of determinations by said first means for determining.

6. A system as recited in claim 5, wherein said means for decoding low resolution information comprises means for optically acquiring a target in accordance with said decoded low resolution information.

7. A system as recited in claim 5, further comprising:
    high resolution sensing means for optically sensing light reflected from said information-encoded subcells and providing electrical signals representative of said reflected light;
    means for transmitting said electrical signals;
    second means for determining that an optically sensed subcell has one optical property of said differing optical properties in accordance with said transmitted electrical signals; and,
    means for decoding high resolution information in accordance with a plurality of determinations by said second means for determining.

8. A system as recited in claim 7, wherein said low resolution sensing means and said high resolution sensing means comprise electronic signal processing means.

9. A system as recited in claim 7, wherein said means for decoding high resolution information comprises means for determining the location within said optically sensed cell of at least one optically sensed subcell having an optical property differing from said determined cell optical property.

10. A system as recited in claim 1, wherein the information of said information-encoded cells comprises acquisition information for optically acquiring said label by optical scanning equipment.

11. A system as recited in claim 1, wherein the information of said information-encoded subcells comprises data information.

12. A system as recited in claim 1, further comprising means for affixing said optically readable label to a surface.

13. A system as recited in claim 1, further comprising means for printing said optically readable label on a surface.

14. A system as recited in claim 1, wherein said multiplicity of information-encoded cells are arranged contiguously.

15. A process for encoding and decoding information in an optical scanning system having an optically readable label comprising a multiplicity of cells and means for optically sensing said label, comprising the steps of:
- (a) encoding a selected cell of said multiplicity of cells at a first low resolution in accordance with first information;
- (b) dividing said selected cell into information-encoded subcells wherein each subcell formed thereby is adapted to have at least two differing optical properties; and,
- (c) encoding said subcells at a second high resolution in accordance with second information.

16. A process as noted in claim 15, wherein step (a) comprises the step of assigning a first optical property of said differing optical properties to said selected cell.

17. A process as recited in claim 16, comprising the step of assigning said first optical property to said selected cell in accordance with said first information.

18. A process as recited in claim 17, wherein step (c) comprises the step of assigning said first optical property to at least a majority of said subcells of said selected cell.

19. A process as recited in claim 18, wherein there is provided at least one minority subcell, said minority subcell having a second optical property of said differing optical properties, comprising the further step of disposing said minority subcell at a selected position within said selected cell in accordance with said second information.

20. A process as recited in claim 18, comprising the further steps of:
- (g) repeating steps (a)–(d) for the remaining cells in said multiplicity of cells;
- (h) illuminating said multiplicity of cells;
- (i) optically sensing light reflected from said cells by means of low resolution sensing means and providing electrical signals representative of said reflected light;
- (j) transmitting said electrical signals;
- (k) determining in accordance with said transmitted electrical signals that an optically sensed cell is assigned a first optical property of said different optical properties when a majority of subcells of said optically sensed cells are assigned said first optical property; and,
- (l) decoding low resolution information in accordance with a plurality of determinations as set forth in (k).

21. A process as recited in claim 20, comprising the further steps of:
- (m) optically sensing light reflected from said subcells with high resolution sensing means and providing electrical signals representative of said reflected light;
- (n) transmitting said electrical signals;
- (o) determining that an optically sensed subcell is assigned one of said differing optical properties in accordance with said transmitted electrical signals; and,
- (p) decoding high resolution information in accordance with a plurality of determinations as set forth in step (o).

22. A process as recited in claim 21, wherein the optical sensing of step (i) and step (m) is performed by the same electric-optic equipment and said high resolution sensing means and said low resolution sensing means comprise electronic signal processing means.

23. A process as recited in claim 15, wherein step (a) comprises the step of encoding acquisition information as said first information in said selected cell for acquiring said label by optical scanning equipment.

24. A process as recited in claim 23, wherein step (c) comprises the step of encoding data information as said second information in said subcells.

25. A process as recited in claim 23, comprising the further steps of:
- (d) assigning said first optical property of said differing optical properties to a first plurality of said selected cells;
- (e) assigning a second optical property of said differing optical properties to a second plurality of said selected cells; and,
- (f) arranging said first plurality of selected cells and said second plurality of selected cells as an acquisition target for acquiring said label by optical scanning equipment.

26. A process as recited in claim 25, comprising the further step of arranging said first and second pluralities of selected cells as respective first and second concentric rings of cells, each ring of said first and second concentric rings being formed of information-encoded cells having one of said first and second differing optical properties.

27. A process as recited in claim 15, wherein step (b) comprises dividing said information-encoded cells into two-by-two arrays of four information-encoded subcells.

28. A process as recited in claim 15, wherein said cells of said multiplicity of cells are arranged contiguously.

29. A process as recited in claim 15, comprising the further step of affixing said optically readable label to a surface.

30. A process as recited in claim 15, comprising the further step of printing said optically readable label on a surface.

31. A process for decoding electrical signals representing an optically sensed image corresponding to a multiplicity of cells encoded in a predetermined pattern, comprising the steps of:
- (a) determining the intensities of said optical properties of said cells;
- (b) searching said intensities of said optical properties of step (a) to identify the optical properties of said cells;
- (c) dividing said cells into subcells wherein each subcell formed thereby is adapted to have at least two differing optical properties;
- (d) determining that a cell is assigned a first optical property when a majority of subcells of said determined cell is assigned said first optical property; and,
- (e) decoding said cells by performing a decoding process which is the inverse of the encoding process for said cells.

32. A process as recited in claim 31, comprising determining acquisition information in accordance with the decoding of step (e).

33. A process as recited in claim 31, comprising further the steps of:
- (f) determining the intensities of said optical properties of said subcells;
- (g) searching said intensities of said optical properties of step (f) to identify the optical properties of said subcells;

(h) determining that a subcell is assigned a first optical property in accordance with step (g); and, (i) decoding said subcells by performing a decoding process which is the inverse of the encoding process for said subcells.

34. A process as recited in claim 33, comprising the further steps of:

(j) determining the location of a minority subcell within a cell; and, (k) performing the determination of step (d) in accordance with the determination of step (i).

35. In a system for optically reading an encoded label, a label for storing a multi-resolution pattern comprising a multiplicity of cells, each of said cells having one of at least two differing optical properties detectable at low resolution, each of said cells being divided into a plurality of subcells, each of said subcells formed thereby having one of at least two differing optical properties detectable at high resolution wherein each of said cells is determined to have a first optical property shared by the majority of its respective subcells when scanned at low resolution and a subcell of the minority of its respective subcells having a second optical property is disposed at a position within said cells determined in accordance with information.

36. In a system for optically reading an encoded label, a label for storing a multi-resolution pattern comprised of a multiplicity of low resolution cells, each of said low resolution cells being adapted to be determined at a first optical sampling rate and having one of at least two differing optical properties, each of said low resolution cells having at least four high resolution subcells adapted to be determined at a second optical sampling rate differing from said first optical sampling rate and having one of at least two differing optical properties, wherein each of said low resolution cells is determined to have the optical property shared by the majority of its respective high resolution subcells when said low resolution cells are determined at said first optical sampling rate.

37. A process for encoding an optically readable label comprised of a multi-resolution pattern of cells, each of said cells having one of at least two differing optical properties detectable at low resolution, comprising the steps of:

(a) encoding said cells at low resolution;

(b) dividing each of said cells into a plurality of subcells, each of said subcells formed thereby having one of at least two differing optical properties detectable at high resolution; and, (c) encoding said subcells at high resolution by disposing a subcell of a first minority optical property at a position within said cells determined in accordance with information, wherein each of said cells is determined to have the optical property shared by the majority of its respective subcells when scanned at low resolution.

38. A process for decoding electrical signals representing an optically sensed image corresponding to a multiplicity of low resolution cells encoded in a multi-resolution pattern, each cell of said multi-resolution pattern having one of at least two differing optical properties comprising the steps of:

(a) dividing said low resolution cells into a plurality of high resolution subcells wherein each of said high resolution subcells formed thereby has at least two differing optical properties detectable at high resolution;

(b) determining that a low resolution cell is assigned a first optical property when a majority of high resolution subcells of said determined high resolution cell are assigned said first optical property;

(c) decoding said low resolution cells of said multi-resolution pattern by performing a decoding process which is the inverse of the encoding process for said low resolution cells; and, (d) decoding said high resolution information in accordance with the position of minority subcells having a second optical property.

* * * * *

UNITED STATES PATENT AND TRADEMARK OFFICE
CERTIFICATE OF CORRECTION

PATENT NO. : 5,241,166
DATED : August 31, 1993
INVENTOR(S) : Donald G. Chandler

It is certified that error appears in the above-indentified patent and that said Letters Patent is hereby corrected as shown below:

Column 3, Line 58, please delete "plan".

Signed and Sealed this

Twenty-sixth Day of April, 1994

Attest:

BRUCE LEHMAN

Attesting Officer     Commissioner of Patents and Trademarks